(12) United States Patent
Poizot et al.

(10) Patent No.: US 9,428,387 B2
(45) Date of Patent: Aug. 30, 2016

(54) PROCESS FOR PREPARING A CARBON FOAM AND USE OF THE MATERIAL OBTAINED

(75) Inventors: Philippe Poizot, Grandchamp-des-Fontaines (FR); Franck Dolhem, Amiens (FR); Jean-Noel Chotard, Amiens (FR)

(73) Assignees: CENTRE NATIONAL DE LA RECHERCHE SCIENTIFIQUE, Paris (FR); UNIVERSITE DE PICARDIE JULES VERNE, Amiens (FR)

( * ) Notice: Subject to any disclaimer, the term of this patent is extended or adjusted under 35 U.S.C. 154(b) by 114 days.

(21) Appl. No.: 14/235,642

(22) PCT Filed: Jul. 26, 2012

(86) PCT No.: PCT/FR2012/051776
§ 371 (c)(1),
(2), (4) Date: Jun. 11, 2014

(87) PCT Pub. No.: WO2013/014395
PCT Pub. Date: Jan. 31, 2013

(65) Prior Publication Data
US 2015/0056126 A1     Feb. 26, 2015

(51) Int. Cl.
*C01B 31/02*    (2006.01)
*B01J 20/20*    (2006.01)
*H01M 4/96*     (2006.01)
*B01J 20/28*    (2006.01)
*B01J 20/30*    (2006.01)

(52) U.S. Cl.
CPC ............ *C01B 31/02* (2013.01); *B01J 20/20* (2013.01); *B01J 20/28045* (2013.01); *B01J 20/28064* (2013.01); *B01J 20/28083* (2013.01); *B01J 20/3078* (2013.01); *H01M 4/96* (2013.01); *Y02E 60/50* (2013.01)

(58) Field of Classification Search
CPC ........................................ C01B 31/02
See application file for complete search history.

(56) References Cited

U.S. PATENT DOCUMENTS

| 4,873,218 | A | 10/1989 | Pekala |
| 8,257,676 | B2 * | 9/2012 | Fan .................... 423/445 R |
| 2005/0207962 | A1 | 9/2005 | Dietz et al. |
| 2011/0140051 | A1 | 6/2011 | Sonntag et al. |

FOREIGN PATENT DOCUMENTS

JP    20070067465    11/2007

OTHER PUBLICATIONS

"Carbon aerogels for catalysis applications: An overview" Moreno et al. Dated 2004.
"Oxocarbons and Pseudooxocarbons" Seitz et al. Dated 1992.

* cited by examiner

*Primary Examiner* — Stuart Hendrickson
(74) *Attorney, Agent, or Firm* — Sofer & Haroun, LLP

(57) ABSTRACT

The present invention relates to a process for preparing a carbon foam, from selected oxocarbons or pseudo-oxocarbons, at low temperature and to the use of the material obtained via the implementation of this process for the manufacture of a system for detecting light waves.

10 Claims, 4 Drawing Sheets

PROCESS FOR PREPARING A CARBON FOAM AND USE OF THE MATERIAL OBTAINED

RELATED APPLICATIONS

This application is a National Phase Application of PCT/FR2012/051776, filed on Jul. 26, 2012. which in turn claims the benefit of priority from French Patent Application No. 11 56870 filed on Jul. 27. 2011, the entirety of which are incorporated herein by reference.

BACKGROUND

Field of the Invention

The present invention relates to a process for preparing a carbon foam, from selected oxocarbons or pseudo-oxocarbons, at low temperature, and to the use of the material obtained by implementing this process for manufacturing a system for detecting light waves.

Description of Related Art

Pure carbon exists in two allotropic crystalline forms: diamond and graphite. In nature, a third source of pure carbon is amorphous carbon (soots), a disordered state of the substance. At the end of the 1980s new (artificial) types of carbon were identified, such as fullerenes and nanotubes (single or multiwall). More recently it has been shown that it is possible even to prepare individual carbon sheets with a thickness of one C atom (graphene) which is a two-dimensional carbon crystal formed from hexagonal cells. The richness of the chemistry of carbon arises from the different electronic configurations it is able to adopt, leading to remarkable properties being obtained.

Apart from the diamond allotrope, which requires stringent synthesis conditions (high pressure: 70 000 atm, high temperature: 1500 to 3000° C.), there are two conventional pathways which allow production of carbon at relatively low temperature.

The first pathway is pyrolysis (or carbonization). This method involves decomposing an organic compound by heat (without a flame, in order to prevent oxidation). For example, organic substances such as coal, anthracite, petroleum cokes, and pitches (obtained by distilling tars), polymers, and hydrocarbons are the precursors which result in artificial graphite. In the presence of a metal catalyst, the pyrolysis of hydrocarbons can also be used to form carbon nanotubes (M. Terrones, Annu. Rev. Mater. Res., 2003, 33, 419). During the pyrolysis, a number of steps occur: the removal of the volatile substances present in the raw materials, the breakage of the bonds in the precursors, the removal of hydrogen, multiple polymerizations, etc. The final pyrolysis temperature governs the degree of carbonization and the residual level of elements other than carbon. Generally speaking, pyrolysis is carried out by gradually heating the raw materials to approximately 1000° C. This technique, however, necessitates a plurality of steps, the handling of hydrocarbons, in particular in gas form, and the use of high temperatures, typically of more than 600° C.

The second pathway exploits the Boudouard equilibrium, which is simply the solid-gas dismutation equilibrium of carbon monoxide, and may be written as follows (equation 1):

$$2\ CO_{(g)} \leftrightarrows CO_{2(g)} + C_{(s)} \quad (1)$$

Like any equilibrium, shifting it is tied to the temperature conditions. Accordingly, though CO is stable above 950° C. at atmospheric pressure, it undergoes decomposition at lower temperatures, to give carbon and gaseous $CO_2$. Thermodynamically, at temperatures less than 400° C., the CO is entirely dissociated (D. G. Walker, L. Hadley-Coates, Int. J. Energ. Res., 1988, 12, 243). One of the applications of equilibrium (1) is the formation of carbon in the form of nanotubes or fibers under catalytic conditions (use of Mo or Fe, for example (M. Terrones, ibid.)). This process leads to particular types of carbon (nanotubes or fibers), and inevitably involves the handling of CO gas or of CO-based metal complexes which exhibit a high toxicity (typically $Fe(CO)_5$).

Accordingly, a number of synthesis methods have been developed, and there is nowadays, therefore, a wide panel of types of carbon, which are characterized by different structures, morphologies, and textures, and especially high-porosity carbon materials. The porous carbon materials constitute materials of choice for numerous applications such as water and air purification, adsorption, catalysis in heterogeneous phase, the manufacture of electrodes, and the storage of energy, by virtue of their high specific surface area, their large pore volume, their insensitivity to surrounding chemical reactions, and their good mechanical properties. Carbon materials exhibiting a high porosity include, more particularly, the "carbon gels" which are obtained by pyrolysis of porous organic gels (prepared upstream) at temperatures of between 500 and 2500° C. (see, for example, U.S. Pat. No. 4,873,218 and W02009/125094), the latter being obtained conventionally from the sol-gel condensation of certain organic monomers such as resorcinol (R)/formaldehyde (F) mixtures (Pekala method), the selection of the drying method leading either to aerogels or to xerogels (see, in particular, C. Moreno-Castilla, F. J. Maldonado-Hódar, Carbon, 2005, 43, 455). These carbon "gels" are characterized by an interconnected network of carbon nanoparticles, giving way to a high porosity which induces a low density. These processes nevertheless exhibit a certain number of drawbacks insofar as they require a plurality of steps involving a sol-gel synthesis, specific drying conditions, and a highly controlled pyrolysis (temperatures greater than 600° C.), and also the use of a multiplicity of reactants.

The objective of the present invention is to provide a process for preparing a high-porosity carbon material that allows the drawbacks of the processes used in the prior art to be remedied. More particularly, the object the inventors set themselves was to develop a process for preparing highly porous carbon materials that should be simple to implement, rapid (ideally in a single step), relatively inexpensive, and nontoxic.

Objects and Summary

This objective is attained by the process which forms the subject of the present invention and which will be described hereinafter.

The present invention accordingly provides a process for preparing a porous carbon material, characterized in that it comprises at least one step of heat treatment at a temperature of at least 300° C., under a nonoxidizing atmosphere, of an organic molecule selected from the oxocarbons and pseudo-oxocarbons of formulae (I-1) to (I-7) below:

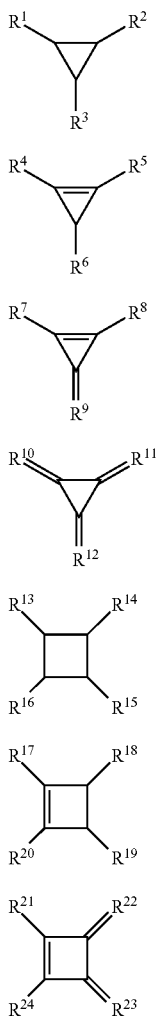

(I-1)
(I-2)
(I-3)
(I-4)
(I-5)
(I-6)
(I-7)

in which:
R¹ to R⁸, R¹³ to R²¹, and R²⁴, independently of one another, represent OH; SH; an O-alkyl or S-alkyl group in which the alkyl radical is linear and comprises from 1 to 4 carbon atoms; an O-aryl or S-aryl group in which the aryl ring is a phenyl ring or a phenyl ring substituted in para position by an O-methyl or S-methyl group; or a group NR²⁵R²⁶ in which the radicals R²⁵ and R²⁶, which are identical or different, represent a C₁-C₄ alkyl radical;
R⁹ to R¹² and R²² and R²³, independently of one another, represent an oxygen or sulfur atom; an N—CN (isocyano) group; or a C(CN)₂ (malononitrile) group.

The implementation of such a process gives rise to the forceful and total decomposition of the compounds of formulae (I-1) to (I-7) (in accordance with a single exothermic reaction) and leads at the same time to the formation of carbon and gases (H₂O, CO₂, CO when the heteroatom is oxygen). The mechanism of formation of this carbon is that of a pyrolysis coupled in part to the formation of Boudouard carbon owing to the release of CO generated during the decomposition. As well as the fact that the temperature for obtaining pure carbon is relatively low (for a pyrolysis) and that the process in itself is extremely simple and relatively inexpensive, another surprising property arises from the fact that the resulting carbon takes the form of a low-density expanded foam, which has photoacoustic properties.

The compounds of formulae (I-1) to (I-7) are known compounds which may be obtained either commercially or by synthesis, in accordance, for example, with the processes described by Gunther Seitz and Peter Imming (Chem. Rev., 1992, 1227-1260).

In the compounds of formulae (I-1) to (I-7) above:
the alkyl radical stated for R¹ to R⁸, R¹³ to R²¹, and R²⁴ is preferably a methyl radical;
R²⁵ and R²⁶ are preferably identical and represent a methyl.

According to one preferred embodiment of the invention, the process employs an organic molecule selected from the compounds of formulae (I-1) to (I-7) in which the substituents R are selected from OH and O.

According to one especially preferred embodiment of the invention, the process employs a compound of formula (I-3) in which R⁷=R⁸=OH and R⁹=O, or a compound of formula (I-7) in which R²²=R²³=O and R²¹=R²⁴=OH. These compounds correspond, respectively, to deltic acid and to squaric acid, the latter being especially preferred according to the invention. In accordance with the IUPAC nomenclature, deltic acid corresponds to 2,3-dihydroxycycloprop-2-en-1-one (CAS No. 54826-91-4), and squaric acid to 3,4-dihydroxycyclobut-3-ene-1,2-dione (CAS No. 2892-51-5).

According to one preferred embodiment, the heat treatment temperature is of the order of 400° C.

The nonoxidizing atmosphere is preferably provided by a stream of dinitrogen, argon, helium, hydrogen, said streams being used alone or as a mixture.

According to one particularly preferred embodiment of the invention, the heat treatment is carried out at atmospheric pressure and without metal catalyst.

According to the process in accordance with the invention, the organic starting molecule is used in powder form.

The heat treatment may for example be carried out in a horizontal tubular oven.

The duration of the heat treatment is preferably from 2 to 4 hours.

The heat treatment is preferably carried out with a temperature rise of from 1 to 10° C./minute, from the ambient temperature to the desired temperature (of at least 300° C.). A temperature plateau may then be imposed; treatment or activation at a higher temperature may also be envisaged.

The carbon material obtained by implementing the process described above consists of a porous matrix composed essentially of carbon in sp² configuration, with interconnected pores which have an average size of approximately 40 Å.

This material exhibits a (BET) specific surface area of the order of 750 m²/g, with a surface area contribution by the pores of approximately 300 m²/g.

Generally speaking, the material takes the form of a (monolithic) expanded foam which may, where appropriate, be reduced to powder in accordance with the desired applications.

It is clearly established that the particular morphology of the carbon obtained in this way (highly aerated foam) is due to forceful decomposition of the reactant, this being explained by the particularly strained structure of said reactant (C3 or C4 ring) and being accompanied by release of gas bubbles around which the carbon forms. In view of this particular morphology, the porous carbon material obtained from implementing the process in accordance with the invention presents an effective photoacoustic response.

DETAILED DESCRIPTION

Figure 1:
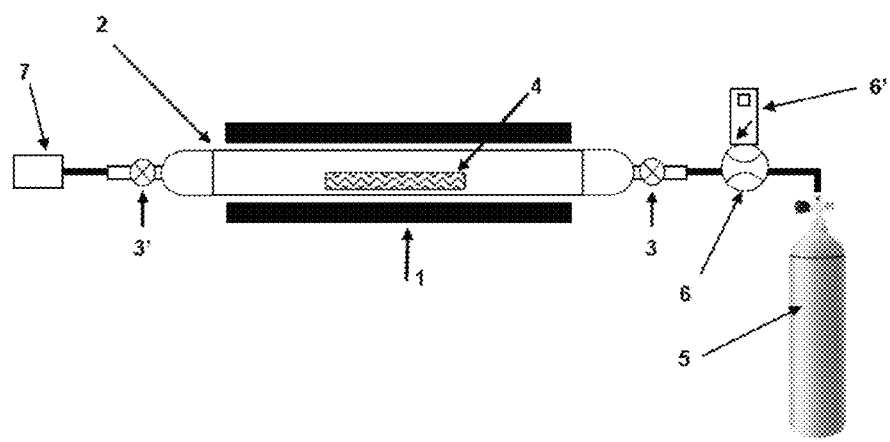
FIG. 1 is an illustration of the equipment used for the experimentation in example 1, in accordance with one embodiment.

Accordingly, the invention likewise provides the use of a porous carbon material obtained by implementing the process in accordance with the invention, for manufacturing a system for detecting light waves. This material as defined above, indeed, is capable of converting an optical signal by transduction to an acoustic wave (excitation at a wavelength within the UV visible spectral range).

The present invention is illustrated by the following embodiment examples, but is not limited thereto.

EXAMPLES

The carbon materials synthesized were characterized as follows:

Thermogravimetric analyses coupled to mass spectrometry were carried out using an instrument sold under the trade name STA 449C Jupiter (Netzsch), employing an alumina boat and a heating rate of 1° C./min (argon flow rate: 50 mL/min).

Differential scanning calorimetry (DSC) analyses were performed by means of an instrument sold under reference 204F1 (Netzsch), employing an aluminum boat and a heating rate of 1° C./min (argon flow rate: 200 mL/min).

Temperature measurements of X-ray diffraction were conducted by means of a D8 Advance diffractometer (Bruker) equipped with a cobalt anticathode ($\lambda_{K\alpha 1}$=1.788970 Å, $\lambda_{K\alpha 2}$=1.792850 Å) and with an Anton Paar HTK1200 heating chamber. Throughout the experiment period, the sample was maintained under a constant stream of argon. A total of 21 diffractograms were recorded. The first at ambient temperature, the next 19 every 20° C. between 40 and 400° C., with a heating rate of 3° C./min, and a last again at ambient temperature after cooling. Each diffractogram was recorded between 10 and 70° (2θ) with a step of 0.03° and a scan rate of 1.5 s/step, corresponding to acquisition times of approximately 53 minutes.

The morphology of the resulting carbon was characterized by transmission electron microscopy (TEM) using a Tecnai F20 S-TWIN® microscope from FEI.

The carbon was also characterized by Raman and Infrared (FTIR) spectroscopy. The Raman measurements were performed on a Jobin-Yvon T6400 spectrometer equipped with a triple monochromator and with a CCD detector cooled by liquid nitrogen. The samples analyzed were illuminated by a laser beam with a wavelength of 514 nm and a laser output power of 20 mW. The measurements were made in confocal mode in the 500-2200 $cm^{-1}$ range, with a resolution of 1 $cm^{-1}$. The spectra were obtained after acquisition of 10 measurements of 5 seconds. The FTIR measurements were carried out on a Bruker Vector 22® Fourier transform infrared spectrometer in transmission mode. This spectrometer was equipped with a DTGS detector with a resolution of 1 $cm^{-1}$, and with a KBr separating filter. These measurements were carried out by accumulation of 30 measurements. The acoustic emission measurements were performed by means of a piezoelectric sensor. The detector signal was subsequently amplified by a +40 dB amplifier in the 20-1200 kHz frequency range.

The photoacoustic measurements were carried out by coupling of a photographic flash and an acoustic detection system. Detection and conversion of the acoustic signal were performed by a broadband piezoelectric sensor. The signal was preamplified with a gain of 40 dB in the 20-1200 kHz frequency range. An acquisition map allows the electrical signals to be converted to digital signals after filtering and amplification.

The specific surface area measurements were made at 77.4 K by dinitrogen adsorption-desorption techniques, using an instrument sold under the Micromeritics ASAP 2010 name; analysis took place by the BET or BJH calculation methods. Prior to analysis, the samples were treated at 300° C. for 4 hours under reduced pressure (15 μm Hg), in order to remove a maximum of adsorbed species.

Example 1

Preparation and Characterization of a Porous Carbon Material by the Process in Accordance with the Invention from Squaric Acid 1): Equipment and Method On the experimental scale, the carbon material was synthesized in a temperature-programmable horizontal tubular oven (1) as shown in attached FIG. 1. of type 55035 (Lindberg company), equipped with a pyrex tube (2) with a length of 45 cm (diameter 29/32) fitted with two isolation valves (3, 3'), the pyrex tube being intended to receive an alumina combustion boat (4) (High-alumina combustion boat, CoorsTek, Inc., Item No.: 65564), containing the powder of the organic molecule for treatment, said tube being connected to an inert gas circuit fed by means of a bomb (5) under pressure (P=1.1 bar, flow rate=2-5 SCCM (Standard Centimeter Cube per Minute)), said gas circuit being opened with inlet control by means of a volume flow meter (6) with digital display (6') and terminated by a sparger (7) filled with silicone oil, so as to prevent any air entering the assembly.

350 mg of squaric acid (Alfa Aesar) were placed beforehand in the combustion boat (5), which was then placed into the oven tube (2). When the boat (5) had been placed in the pyrex tube (2) and the entire assembly had been placed under a dinitrogen atmosphere, the temperature was raised to 400° C. at a rate of 1° C./min, followed by a plateau of 2 hours.

A carbon foam was obtained, and was subsequently characterized.

Thermal analysis of the starting squaric acid was also performed.

2) Results and Characterizations

Figure 2:
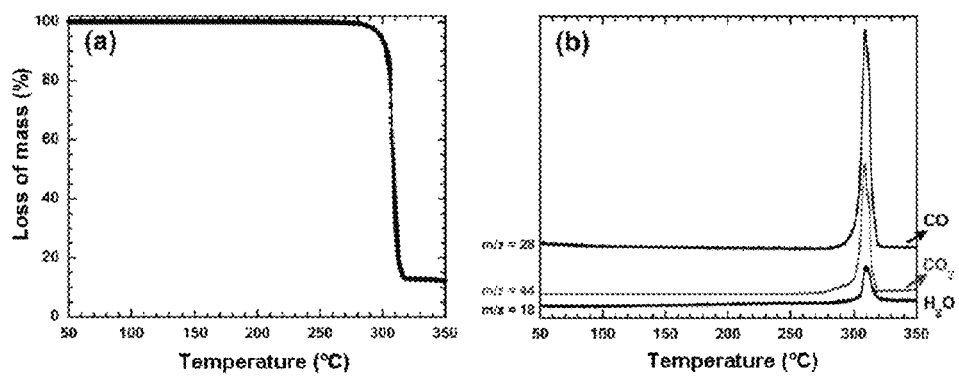
FIGS. 2a, 2b and 3 are thermal analysis of the squaric acid of example 1, in accordance with one embodiment.
Figure 3:
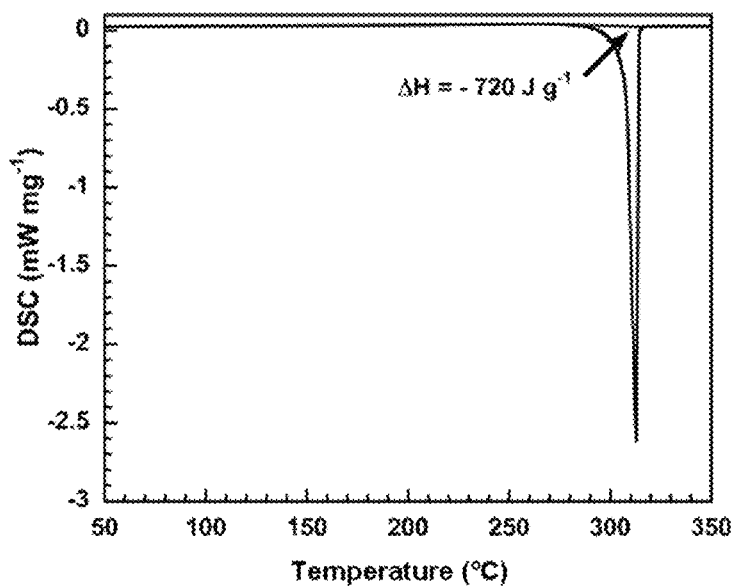

FIGS. 2 and 3 attached represent the thermal analysis of the squaric acid. In FIG. 2a, the loss of mass (in %) is expressed as a function of temperature, with FIG. 2b representing the associated mass spectrometry data (the m/z values of 18, 28 and 44 correspond, respectively, to the releases of $H_2O$, CO, and $CO_2$). FIG. 3 is a differential scanning calorimetry measurement (thermogram expressed in $mW.mg^{-1}$ as a function of the temperature rise in ° C.), allowing attainment of the enthalpy value for the pyrolysis reaction by integration of the exothermic peak.

Figure 4:
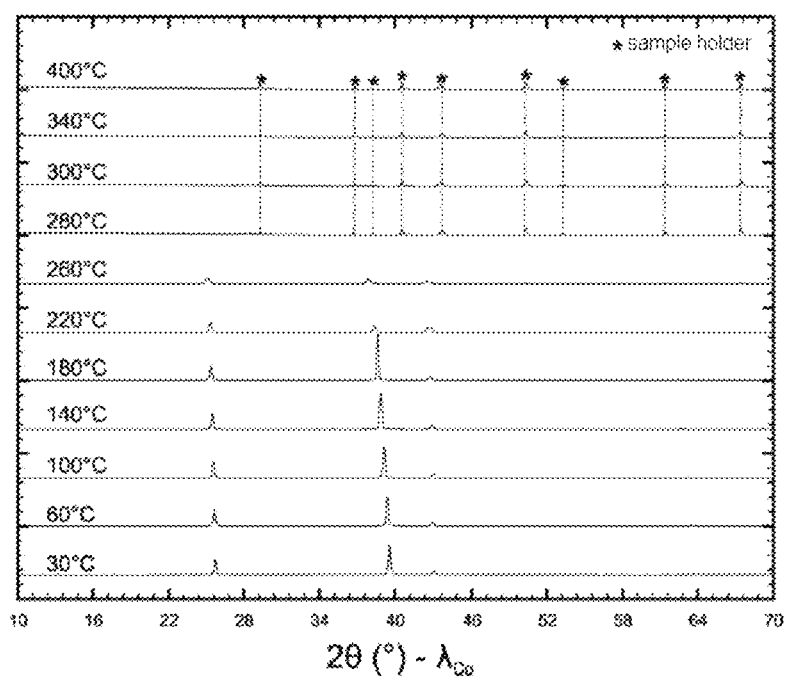
FIG. 4 is an X-ray diffraction profile for the squaric acid of example 1, in accordance with one embodiment.

These results, coupled with the heating-chamber X-ray diffraction profile (FIG. 4 attached), show that the squaric acid is stable to approximately 280° C. Beyond this, this organic compound undergoes rapid decomposition during a highly exothermic process ($\Delta H=-720$ J $g^{-1}$ or $-82\,080$ J $mol^{-1}$) at close to 300° C. The squaric acid is then decomposed (pyrolyzed) to pure carbon, with release of $H_2O$, CO, and $CO_2$.

Figure 5:
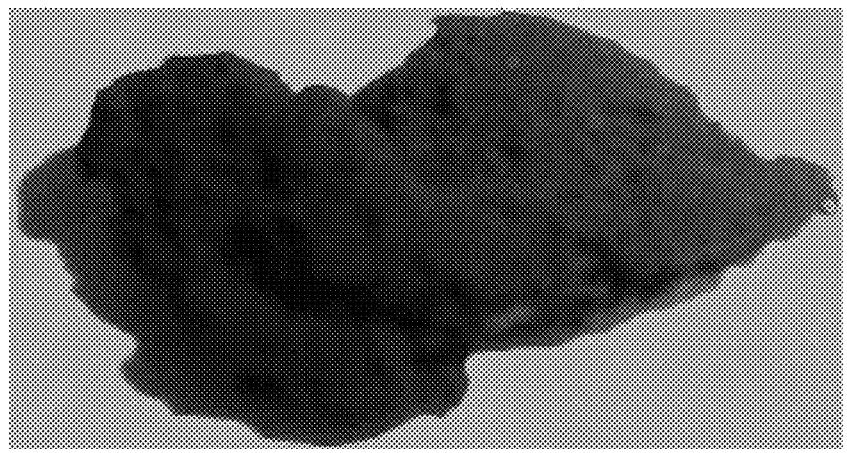
FIG. 5 is a photo of the expanded carbon "foam" of example 1, in accordance with one embodiment

FIG. 5 is a photo of the expanded carbon "foam" thus obtained, for T=400° C. This foam remains mechanically fragile, in view of its high porosity, but nevertheless exhibits a certain flexibility. This foam may subsequently be reduced to powder by manual grinding on a mortar if desired.

Figure 6:
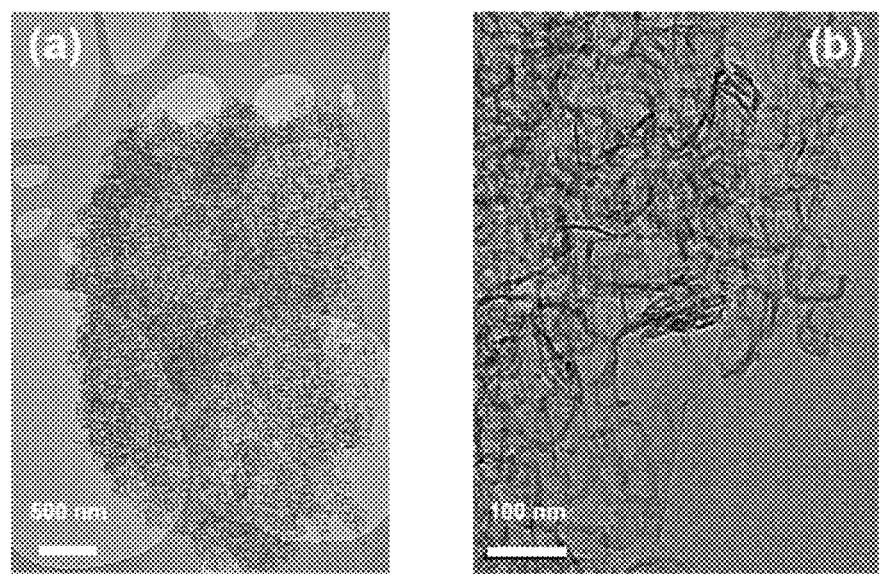
FIGS. 6a and 6b are electron microscopy images show a porous structuring of the product of example 1, in accordance with one embodiment.

The morphology of the carbon produced in this way was characterized by transition electron microscopy. The images are shown in attached FIG. 6 (at two magnifications: a): x 5000 and b) x 38 000 and show a very porous structuring in the manner of an aerogel/xerogel, thereby allowing the carbon membrane to be distinguished by transparency from the microscopy slide-holder situated below the agglomerated mass of carbon particles.

Figure 7:
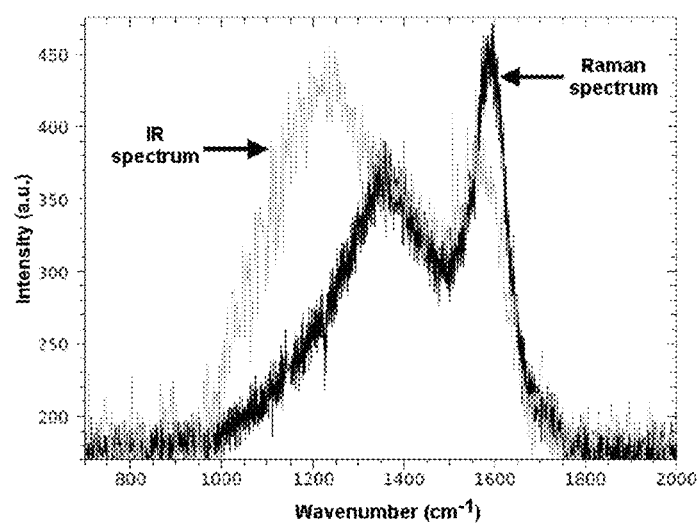
FIG. 7 is a analysis by Raman and FTIR spectroscopy of example 1, in accordance with one embodiment.

The analysis by Raman and FTIR spectroscopy is shown in attached FIG. 7, in which the intensity (in arbitrary units) is a function of the wavelength (in $cm^{-1}$). The black trace is the Raman spectrum, while the FTIR spectrum is the gray trace. The Raman spectrum shows two peaks centered around positions of 1350 $cm^{-1}$ (D peak) and 1590 $cm^{-1}$ (G peak). These two characteristic bands of the carbon correspond to vibrations of the C=C bonds. The low width at half-maximum of the two peaks also suggests high crystallinity of these foams. The FTIR spectrum (gray trace) also confirms this structure, and can be superposed over the Raman spectrum. This behavior confirms that the carbon foams obtained by the process in accordance with the present invention are essentially composed of carbon in $sp^2$ configuration (pure carbon). It should also be noted that the FTIR spectra do not have any peak that might correspond to terminal bonds of $CH_x$, CO, or CN type.

In view of the extremely porous nature of the resulting carbon, a BET specific surface area and a BJH pore distribution measurement was performed on the basis of the physisorption of dinitrogen at 77.4 K. The measurement of the BET specific surface area is of the order of 750 $m^2/g$, with a contribution by the surface area of the micropores of approximately 300 $m^2/g$. The pore distribution is primarily centered on 40 Å.

Figure 8:
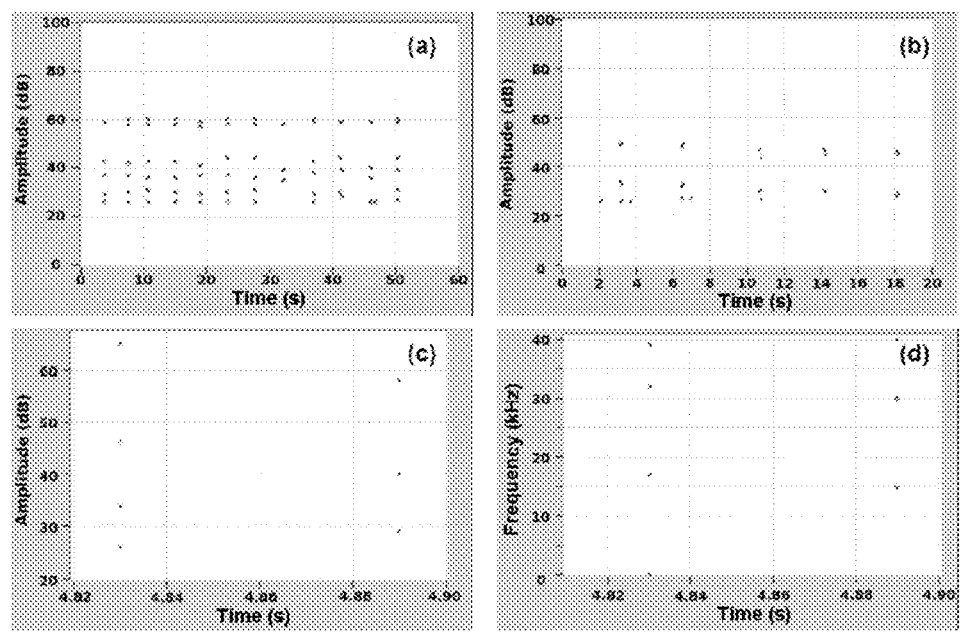
FIGS. 8a-8d are photoacoustic measurements of example 1, in accordance with one embodiment.

The photoacoustic measurements are shown in attached FIG. 8. In FIGS. 8a, 8b, and 8c, the amplitude of the acoustic response (in dB) is a function of time (in s) and, in FIG. 8d, the frequency (in kHz) is a function of time (in s). These photoacoustic measurements show that the phenomenon of photoemission (FIG. 8a) is reproducible and does not give rise to degradation or to irreversible modifications of the material. A more precise measurement shows clearly (FIGS. 8b and 8c) that the acoustic response to illumination generates two signals 0.6 s apart. The two cracks are composed of a number of distinct frequency emissions: 16 kHz, 32 kHz, and 40 kHz (FIG. 8c).

The invention claimed is:

1. A process for preparing a porous carbon material, wherein said method comprises at least one step of heat treatment at a temperature of at least 300° C., under a nonoxidizing atmosphere, of an organic molecule selected from the oxocarbons and oxocarbon derivatives of formulae (I-1) to (I-7) below:

in which:
$R^1$ to $R^8$, $R^{13}$ to $R^{21}$, and $R^{24}$, independently of one another, represent OH; SH; an O-alkyl or S-alkyl group in which the alkyl radical is linear and has from 1 to 4 carbon atoms; an O-aryl or S-aryl group in which the aryl ring is a phenyl ring or a phenyl ring substituted in para position by an O-methyl or S-methyl group; or a group $NR^{25}R^{26}$ in which the radicals $R^{25}$ and $R^{26}$, which are identical or different, represent a $C_1$-$C_4$ alkyl radical;

$R^9$ to $R^{12}$ and $R^{22}$ and $R^{23}$, independently of one another, represent an oxygen or sulfur atom; an N—CN (isocyano) group; or a $C(CN)_2$ (malononitrile) group.

2. The process as claimed in claim 1, wherein in the compounds of formulae (I-1) to (I-7):
the alkyl radical stated for $R^1$ to $R^8$, $R^{13}$ to $R^{21}$, and $R^{24}$ is a methyl radical;
$R^{25}$ and $R^{26}$ are identical and represent a methyl.

3. The process as claimed in claim 1, wherein the process employs an organic molecule selected from the compounds of formulae (I-1) to (I-7) in which the substituents R are selected from OH and O.

4. The process as claimed in claim 1, wherein the organic molecule is a compound of formula (I-3) in which $R^7=R^8=OH$ and $R^9=O$, or a compound of formula (I-7) in which $R^{22}=R^{23}=O$ and $R^{21}=R^{24}=OH$.

5. The process as claimed in claim 1, wherein the heat treatment temperature is 400° C.

6. The process as claimed in claim 1, wherein the non-oxidizing atmosphere is provided by a stream of dinitrogen, argon, helium, hydrogen, said streams being used alone or as a mixture.

7. The process as claimed in claim 1, wherein the heat treatment is carried out at atmospheric pressure and without metal catalyst.

8. The process as claimed in claim 1, wherein the organic starting molecule is used in powder form.

9. The process as claimed in claim 1, wherein the duration of the heat treatment is from 2 to 4 hours.

10. The process as claimed in claim 1, wherein the heat treatment is carried out with a temperature rise of from 1 to 10° C./minute, from the ambient temperature to the desired temperature.

* * * * *